United States Patent
Choi

(10) Patent No.: US 8,103,269 B2
(45) Date of Patent: Jan. 24, 2012

(54) MOBILE TERMINAL AND METHOD OF SELECTING BROADCAST MODE THEREIN

(75) Inventor: Kwang Hun Choi, Suwon-si (KR)

(73) Assignee: LG Electronics Inc., Seoul (KR)

( * ) Notice: Subject to any disclaimer, the term of this patent is extended or adjusted under 35 U.S.C. 154(b) by 464 days.

(21) Appl. No.: 12/345,766

(22) Filed: Dec. 30, 2008

(65) Prior Publication Data

US 2009/0280803 A1 Nov. 12, 2009

(30) Foreign Application Priority Data

May 9, 2008 (KR) .................. 10-2008-0043465

(51) Int. Cl.
*H04W 4/00* (2009.01)
(52) U.S. Cl. ................... 455/426.1; 455/3.01
(58) Field of Classification Search .................. None
See application file for complete search history.

(56) References Cited

U.S. PATENT DOCUMENTS

| | | | |
|---|---|---|---|
| 6,804,510 B1* | 10/2004 | Bates et al. | 455/414.4 |
| 2004/0029525 A1* | 2/2004 | Vertelney | 455/3.03 |
| 2008/0139109 A1* | 6/2008 | Ewertz | 455/3.01 |
| 2011/0075644 A1* | 3/2011 | Feder et al. | 370/338 |

FOREIGN PATENT DOCUMENTS

CN 101166322 A 4/2008

* cited by examiner

*Primary Examiner* — Ajit Patel
(74) *Attorney, Agent, or Firm* — Birch, Stewart, Kolasch & Birch, LLP

(57) ABSTRACT

A mobile terminal including a wireless communication unit configured to receive a broadcast signal, and a controller configured to control the wireless communication unit to receive the broadcast signal corresponding to a first broadcast mode when the first broadcast mode is executed, and to selectively execute a second broadcast mode that is different than the first broadcast mode when a reception of the broadcast signal corresponding to the first broadcast mode fails.

24 Claims, 22 Drawing Sheets

FIG. 6A

| Syntax | Number of bits | Identifier |
|---|---|---|
| service_description_section(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for (i=0; i<N; i++){ | | |
|         serveice_id | 16 | uimsbf |
|         reserved_future_use | 6 | bslbf |
|         EIT_scedule_flag | 1 | bslbf |
|         EIT_present_following_flag | 1 | bslbf |
|         running_status | 3 | uimsbf |
|         free_CA_mode | 1 | bslbf |
|         descriptors_loop_length | 12 | uimsbf |
|         for (j=0; j<N; j++){ | | |
|             descrptor() | | |
|         } | | |
|     } | | |
|     CRC_32 | 32 | rpchof |
| } | | |

FIG. 6B

| Syntax | Number of bits | Identifier |
|---|---|---|
| linkage_descriptor() { | | |
|     descriptor_tag | 8 | uimsbf |
|     descriptor_length | 8 | uimsbf |
|     transport_stream_id | 16 | uimsbf |
|     original_network_id | 16 | uimsbf |
|     service_id | 16 | uimsbf |
|     linkage_type | 8 | uimsbf |
|     if (linkage_type == 0x0B) { | | |
|         platform_id_data_length | 8 | uimsbf |
|         for (i=0; i<N; i++) { | | |
|             platform_id | 24 | uimsbf |
|             platform_name_loop_length | 8 | uimsbf |
|             for (i=0; i<N; i++) { | | uimsbf |
|                 ISO_639_language_code | 24 | bslbf |
|                 platform_name_length | 8 | uimsbf |
|                 for (i=0; i<platform_name_length; i++) { | | |
|                     text_char | 8 | uimsbf |
|                 } | | |
|             } | | |
|         } | | |
|         for (i=0; i<N; i++) { | | |
|             private_data_byte | 8 | uimsbf |
|         } | | |
|     } | | |
| } | | |

FIG. 6C

| Syntax | Number of bits | Identifier |
|---|---|---|
| IP/MAC_notification_info() { | | |
|     platform_id_data_length | 8 | uimsbf |
|     for (i=0; i<N; i++) { | | |
|         platform_id | 24 | uimsbf |
|         action_type | 8 | uimsbf |
|         reserved | 2 | bslbf |
|         INT_versioning_flag | 1 | bslbf |
|         INT_version | 5 | uimsbf |
|         } | | |
|     } | | |
|     for (i=0; i<N; i++) { | | |
|         private_data_byte | 8 | uimsbf |
|     } | | |
| } | | |

FIG. 6D

| Syntax | Number of bits | Identifier | Remarks |
|---|---|---|---|
| IP/MAC_notification_section() { | | | |
|   table_id | | | |
|   section_syntax_indicator | 8 | uimsbf | 0x4C |
|   reserved_for_future_use | 1 | bslbf | 1b |
|   reserved | 1 | bslbf | 1b |
|   section_length | 2 | bslbf | 11b |
|   action_type | 12 | uimsbf | |
|   platform_id_hash | 8 | uimsbf | see table 14 |
|   reserved | 8 | uimsbf | |
|   version_number | 2 | bslbf | 11b |
|   current_next_indicator | 5 | uimsbf | |
|   section_number | 1 | bslbf | 1b |
|   last_section_number | 8 | uimsbf | |
|   platform_id | 8 | uimsbf | |
|   processing_order | 24 | uimsbf | |
|   platform_descriptor_loop() | 8 | uimsbf | 0x00 |
|   for(i=0, i<N1, i++) { | | | |
|     target_descriptor_loop() | | | |
|     operational_descriptor_loop() | | | |
|   } | | | |
|   CRC_32 | 32 | rpchof | |
| } | | | |

FIG. 6E

| Syntax | Number of bits | Identifier |
|---|---|---|
| network_information_section() { | | |
|    table_id | | |
|    section_syntax_indicator | 8 | uimsbf |
|    reserved_for_future_use | 1 | bslbf |
|    reserved | 1 | bslbf |
|    section_length | 2 | bslbf |
|    network_id | 12 | uimsbf |
|    reserved | 16 | uimsbf |
|    version_number | 2 | bslbf |
|    current_next_indicator | 5 | uimsbf |
|    section_number | 1 | bslbf |
|    last_section_number | 8 | uimsbf |
|    reserved_future_use | 8 | uimsbf |
|    network_descriptors_length | 4 | bslbf |
|    for(i=0; i<N; i++) { | 12 | uimsbf |
|      descriptor() | | |
|    } | | |
|    reserved_future_use | 4 | bslbf |
|    transport_stream_loop_length | 12 | uimsbf |
|    for (i; i<N; i++) { | | |
|      transport_stream_id | 16 | uimsbf |
|      original_network_id | 16 | uimsbf |
|      reserved_future_use | 4 | bslbf |
|      transport_descriptors_length | 12 | uimsbf |
|      for(j=0; j<N; j++) { | | |
|        descriptor() | | |
|      } | | |
|    } | | |
|    CRC_32 | 32 | rpchof |
| } | | |

# MOBILE TERMINAL AND METHOD OF SELECTING BROADCAST MODE THEREIN

This application claims the benefit of the Korean Patent Application No. 10-2008-0043465, filed on May 9, 2008, which is hereby incorporated by reference as if fully set forth herein.

BACKGROUND OF THE INVENTION

1. Field of the Invention

The present invention relates to a mobile terminal and corresponding method for providing the user with an option of selecting an alternative second broadcast entry mode when a first broadcast mode can not successfully be performed.

2. Discussion of the Related Art

Mobile terminals now provide many additional services beside the basic call service. For example, user's can now access the Internet, play games, watch videos, listen to music, capture images and videos, record audio files, etc. Mobile terminals also now provide broadcasting programs such that user can watch television shows, sporting programs, videos etc.

In the related art broadcast terminal, the user can request a selected broadcast program and view the broadcast program on their terminal. However, when the broadcast program can not be viewed because of a poor signal reception, a server or network problem, etc., the user can re-request the broadcast program or terminate the requested broadcast program. However, even when the user re-requests the broadcast program, the broadcast program is most likely not to be received at the terminal until the problem is corrected. The continued re-requesting of a particular broadcast program results in unwanted battery consumption.

SUMMARY OF THE INVENTION

Accordingly, one object of the present invention is to address the above-noted and other drawbacks.

Another object of the present invention is to provide a mobile terminal and corresponding method for prompting the user with an alternative second broadcast entry mode when a first broadcast mode can not successfully be performed.

To achieve these objects and other advantages and in accordance with the purpose of the invention, as embodied and broadly described herein, the present invention provides in one aspect a mobile terminal including a wireless communication unit configured to receive a broadcast signal, and a controller configured to control the wireless communication unit to receive the broadcast signal corresponding to a first broadcast mode when the first broadcast mode is executed, and to selectively execute a second broadcast mode that is different than the first broadcast mode when a reception of the broadcast signal corresponding to the first broadcast mode fails.

In another aspect, the present invention provides a method of controlling a mobile terminal, and which includes receiving a broadcast signal corresponding to a first broadcast mode when the first broadcast mode is executed, and selectively executing a second broadcast mode that is different than the first broadcast mode when a reception of the broadcast signal corresponding to the first broadcast mode fails.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6A to 6E are structural diagrams of broadcast service provider identification information according to one embodiment of the present invention;

DETAILED DESCRIPTION OF THE INVENTION

Reference will now be made in detail to the preferred embodiments of the present invention, examples of which are illustrated in the accompanying drawings.

Figure 1:
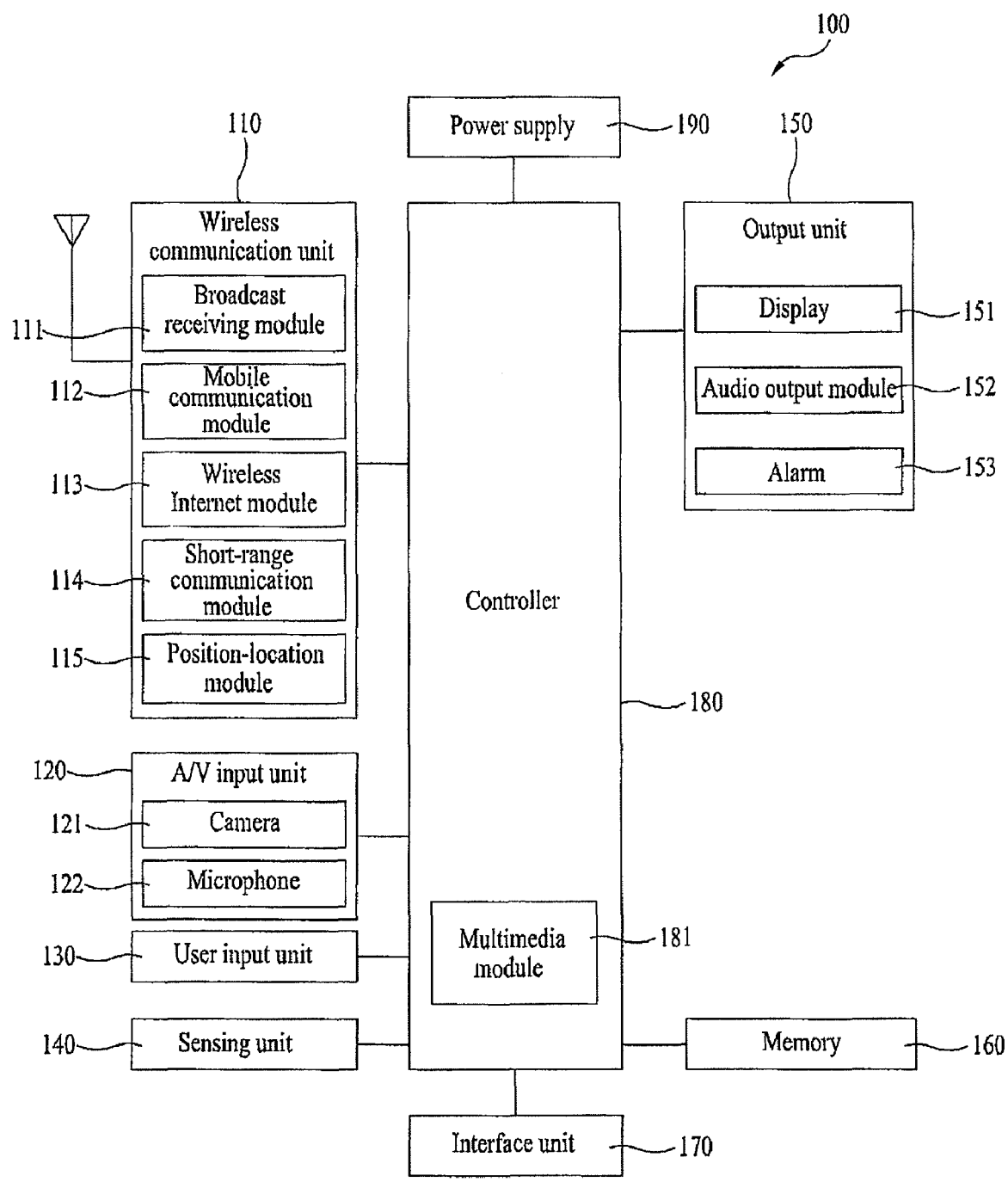
FIG. 1 is a block diagram of a terminal according to an embodiment of the present invention.

FIG. 1 is a block diagram of a mobile terminal 100 according to an embodiment of the present invention. As shown, the mobile terminal 100 includes a wireless communication unit 110 having one or more components which permits wireless communication between the mobile terminal 100 and a wireless communication system or network within which the mobile terminal is located.

For example, the wireless communication unit 110 includes a broadcast receiving module 111 that receives a broadcast signal and/or broadcast associated information from an external broadcast managing entity via a broadcast channel. The broadcast channel may include a satellite channel and a terrestrial channel.

In addition, the broadcast managing entity generally refers to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

In addition, the broadcast signal may be implemented as a TV broadcast signal, a radio broadcast signal, and a data broadcast signal, among others. The broadcast signal may further include a broadcast signal combined with a TV or radio broadcast signal.

The broadcast receiving module 111 is also configured to receive broadcast signals transmitted from various types of broadcast systems. For example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system among others. Receiving multicast signals is also possible. Further, data received by the broadcast receiving module 111 may be stored in a suitable device, such as a memory 160.

The wireless communication unit 110 also includes a mobile communication module 112 that transmits/receives wireless signals to/from one or more network entities (e.g., base station, Node-B). Such signals may represent audio, video, multimedia, control signaling, and data, among others.

Also included is a wireless Internet module 113 that supports Internet access for the mobile terminal. The module 113 may be internally or externally coupled to the terminal. The wireless communication unit 110 also includes a short-range communication module 114 that facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

A position-location module 115 is also included in the wireless communication unit 110 and identifies or otherwise obtains the location of the mobile terminal 100. The position-location module 115 may be implemented using global positioning system (GPS) components which cooperate with associated satellites, network components, and combinations thereof.

In addition, as shown in FIG. 1, the mobile terminal 100 also includes an Audio/video (A/V) input unit 120 that provides audio or video signals to the mobile terminal 100. As shown, the A/V input unit 120 includes a camera 121 and a microphone 122. The camera 121 receives and processes image frames of still pictures or video.

Further, the microphone 122 receives an external audio signal while the portable device is in a particular mode, such as a phone call mode, recording mode and voice recognition mode. The received audio signal is then processed and converted into digital data. Also, the portable device, and in particular, the A/V input unit 120, typically includes assorted noise removing algorithms to remove noise generated in the course of receiving the external audio signal. In addition, data generated by the A/V input unit 120 may be stored in the memory 160, utilized by an output unit 150, or transmitted via one or more modules of the communication unit 110. If desired, two or more microphones and/or cameras may be used.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touch screen display, which will be described in more detail below.

A sensing unit 140 is also included in the mobile terminal 100 and provides status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, etc.

As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply 190, the presence or absence of a coupling or other connection between an interface unit 170 and an external device, etc.

Further, the interface unit 170 is often implemented to couple the mobile terminal 100 with external devices. Typical external devices include wired/wireless headphones, external chargers, power supplies, storage devices configured to store data (e.g., audio, video, pictures, etc.), earphones, and microphones, among others. In addition, the interface unit 170 may be configured using a wired/wireless data port, a card socket (e.g., for coupling to a memory card and a device with an identity module), audio input/output ports and video input/output ports.

In this case, an identity module includes a chip for storing various kinds of information for identifying or authenticating a use authority of the terminal 100. And, the identity module can include one of a user identity module (UIM), a subscriber identity module (SIM), a universal subscriber identity module (USIM), and the like. In particular, the identity module can include a module for identifying or authenticating an authority for a broadcast purchase and/or a broadcast viewing using the terminal 100. And, a device provided with the identity module (hereinafter named 'identity device') can be manufactured into a smart card. Therefore, the identity device can be connected to the terminal 100 via an identity device connecting port.

The output unit 150 generally includes various components which support the output requirements of the mobile terminal 100. The mobile terminal 100 also includes a display 151 that visually displays information associated with the mobile terminal 100. For instance, if the mobile terminal 100 is operating in a phone call mode, the display 151 will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

Further, the display 151 also preferably includes a touch screen working in cooperation with an input device, such as a touchpad. This configuration permits the display 151 to function both as an output device and an input device. In addition, the display 151 may be implemented using display technologies including, for example, a liquid crystal display (LCD), a thin film transistor-liquid crystal display (TFT-LCD), an organic light-emitting diode display (OLED), a flexible display and a three-dimensional display.

The mobile terminal 100 may also include one or more of such displays. An example of a two-display embodiment is one in which one display is configured as an internal display (viewable when the terminal is in an opened position) and a second display configured as an external display (viewable in both the open and closed positions).

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

Further, the audio output module 152 functions in various modes including a call-receiving mode, a call-placing mode, a recording mode, a voice recognition mode and a broadcast reception mode. During operation, the audio output module 152 outputs audio relating to a particular function (e.g., call received, message received, and errors).

In addition, the output unit 150 is further shown having an alarm 153, which is used to signal or otherwise identify the occurrence of a particular event associated with the mobile terminal 100. Typical events include a call received, a message received and user input received. An example of such output includes the providing of tactile sensations (e.g., vibration) to a user. For instance, the alarm 153 may be configured to vibrate responsive to the mobile terminal 100 receiving a call or message.

As another example, a vibration is provided by the alarm 153 responsive to receiving user input at the mobile terminal 100, thus providing a tactile feedback mechanism. Further, the various outputs provided by the components of the output unit 150 may be separately performed, or such output may be performed using any combination of such components.

In addition, the memory 160 is generally used to store various types of data to support the processing, control, and storage requirements of the mobile terminal 100. Examples of such data include program instructions for applications operating on the mobile terminal 100, call history, contact data, phonebook data, messages, pictures, video, etc.

Further, the memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The terminal 100 also includes a controller 180 that typically controls the overall operations of the mobile terminal 100. For instance, the controller 180 performs the control and processing associated with voice calls, data communications, instant message communications, video calls, camera operations and recording operations. As shown in FIG. 1, the controller 180 may also include a multimedia module 181 for providing multimedia playback functions. The multimedia module 181 may be configured as part of the controller 180, or may be implemented as a separate component.

In addition, a power supply 190 provides power used by the various components for the portable device. The provided power may be internal power, external power, or combinations thereof.

Figure 2A:
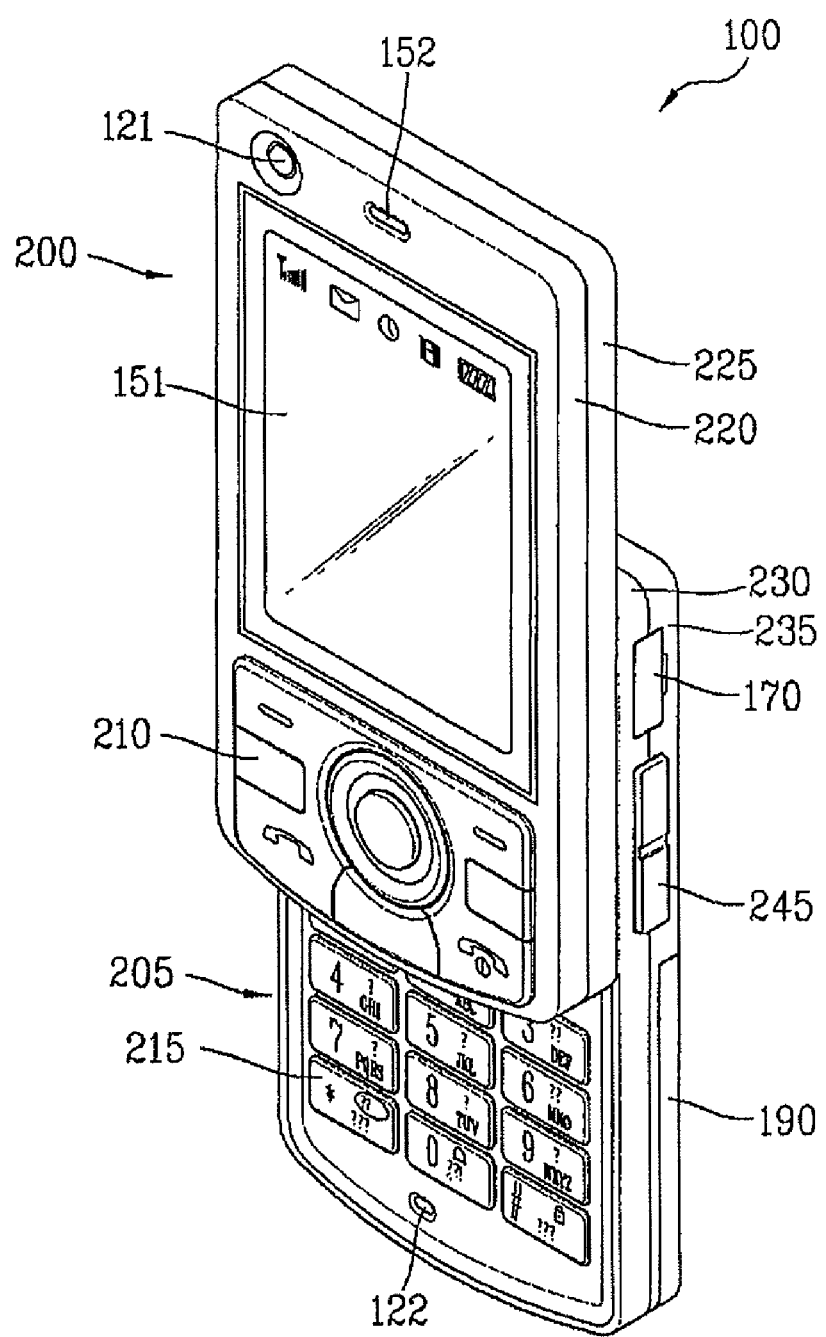
FIG. 2A is a front perspective view of a terminal according to an embodiment of the present invention.

Next, FIG. 2A is a front side view of the mobile terminal 100 according to an embodiment of the present invention. As shown in FIG. 2A, the mobile terminal 100 includes a first body 200 configured to slideably cooperate with a second body 205. The user input unit 130 described in FIG. 1 may include a first input unit such as function keys 210, a second input unit such as a keypad 215, and a third input unit such as side keys 245.

The function keys 210 are associated with the first body 200, and the keypad 215 is associated with the second body 205. The keypad 215 includes various keys (e.g., numbers, characters, and symbols) to enable a user to place a call, prepare a text or multimedia message, and otherwise operate the mobile terminal 100.

In addition, the first body 200 slides relative to the second body 205 between open and closed positions. In a closed position, the first body 200 is positioned over the second body 205 in such a manner that the keypad 215 is substantially or completely obscured by the first body 200. In the open position, user access to the keypad 215, as well as the display 151 and function keys 210, is possible. The function keys 210 are convenient to a user for entering commands such as start, stop and scroll commands.

Further, the mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. However, the mode configuration may be changed as required or desired.

In addition, the first body 200 is formed from a first case 220 and a second case 225, and the second body 205 is formed from a first case 230 and a second case 235. The first and second cases are preferably formed from a suitably ridge material such as injection molded plastic, or formed using metallic material such as stainless steel (STS) and titanium (Ti).

If desired, one or more intermediate cases may be provided between the first and second cases of one or both of the first and second bodies 200 and 205. In addition, the first and second bodies 200 and 205 are typically sized to receive electronic components used to support the operation of the mobile terminal 100.

Also, the first body 200 includes the camera 121 and the audio output unit 152, which is configured as a speaker, positioned relative to the display 151. The camera 121 may also be constructed in such a manner that it can be selectively positioned (e.g., rotated, swiveled, etc.) relative to the first body 200.

Further, the function keys 210 are positioned adjacent to a lower side of the display 151. As discussed above, the display 151 can be implemented as an LCD or OLED. The display 151 may also be configured as a touch screen having an underlying touchpad which generates signals responsive to user contact (e.g., finger, stylus, etc.) with the touch screen.

Also, the second body 205 includes the microphone 122 positioned adjacent to the keypad 215, and side keys 245, which are one type of a user input unit, positioned along the side of the second body 205. Preferably, the side keys 245 are configured as hot keys, such that the side keys 245 are associated with a particular function of the mobile terminal 100. As shown, the interface unit 170 is positioned adjacent to the side keys 245, and the power supply 190 in a form of a battery is located on a lower portion of the second body 205.

Figure 2B:
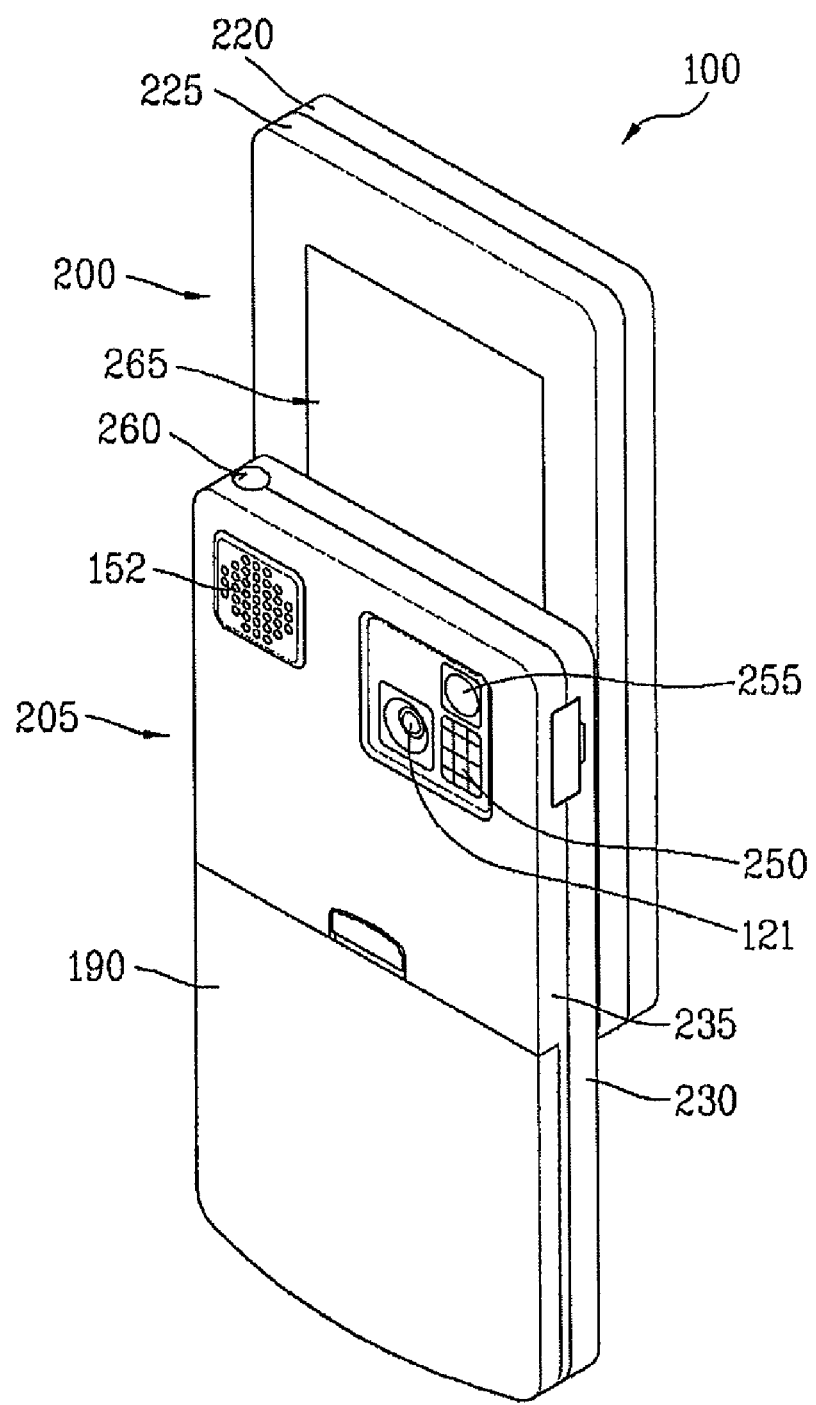
FIG. 2B is a rear perspective view of the terminal shown in FIG. 2A.

FIG. 2B is a rear side view of the mobile terminal 100 shown in FIG. 2A. As shown in FIG. 2B, the second body 205 includes the camera 121, and an associated flash 250 and mirror 255. The flash 250 operates in conjunction with the camera 121 of the second body 205, and the mirror 255 is useful for assisting a user to position the camera 121 in a self-portrait mode. In addition, the camera 121 of the second body 205 faces a direction which is opposite to a direction faced by the camera 121 of the first body 200 shown in FIG. 2A.

In addition, each of the cameras 121 of the first and second bodies 200 and 205 may have the same or different capabilities. For example, in one embodiment, the camera 121 of the first body 200 operates with a relatively lower resolution than the camera 121 of the second body 205. Such an arrangement works well during a video conference call, for example, in which reverse link bandwidth capabilities may be limited. Further, the relatively higher resolution of the camera 121 of the second body 205 (FIG. 2B) is useful for obtaining higher quality pictures for later use.

The second body 205 also includes the audio output module 152 configured as a speaker, and which is located on an upper side of the second body 205. The audio output modules of the first and second bodies 200 and 205 may also cooperate together to provide stereo output. Moreover, either or both of these audio output modules may be configured to operate as a speakerphone.

The terminal 100 also includes a broadcast signal receiving antenna 260 located at an upper end of the second body 205. The antenna 260 functions in cooperation with the broadcast receiving module 111 (FIG. 1). If desired, the antenna 260 may be fixed or configured to retract into the second body 205. Further, the rear side of the first body 200 includes a slide module 265, which slideably couples with a corresponding slide module located on the front side of the second body 205.

In addition, the illustrated arrangement of the various components of the first and second bodies 200 and 205 may be modified as required or desired. In general, some or all of the components of one body may alternatively be implemented on the other body. Further, the location and relative positioning of such components may be positioned at locations which differ from those shown by the representative figures.

Figure 3A:
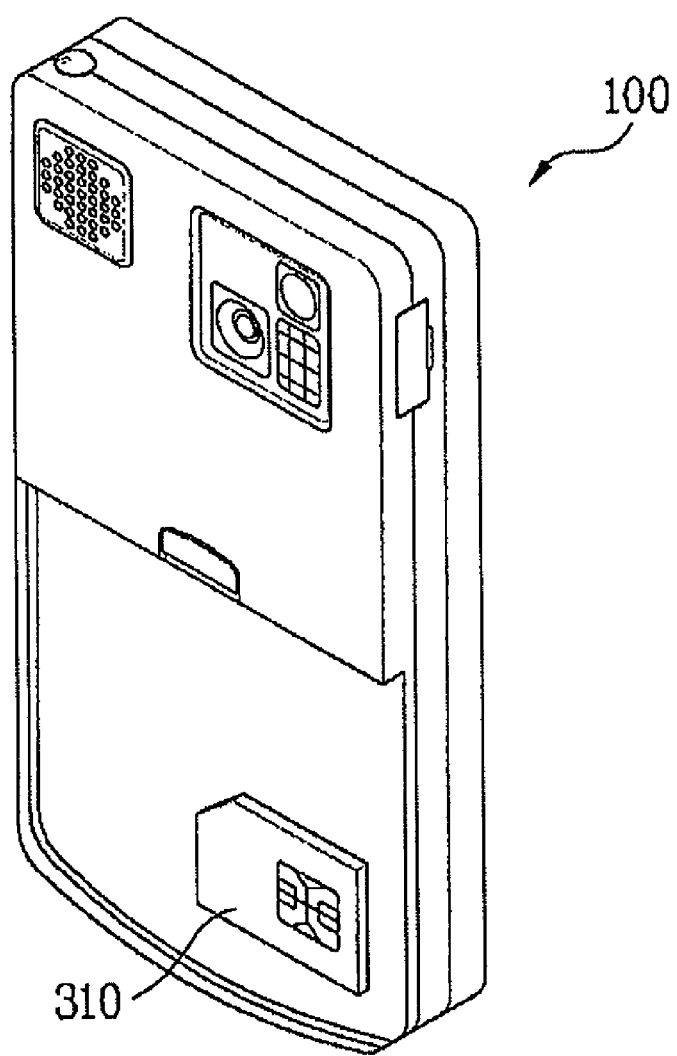
FIGS. 3A and 3B are overview of a terminal according to one embodiment of the present invention, which include an identity module unloaded from the terminal.
Figure 3B:
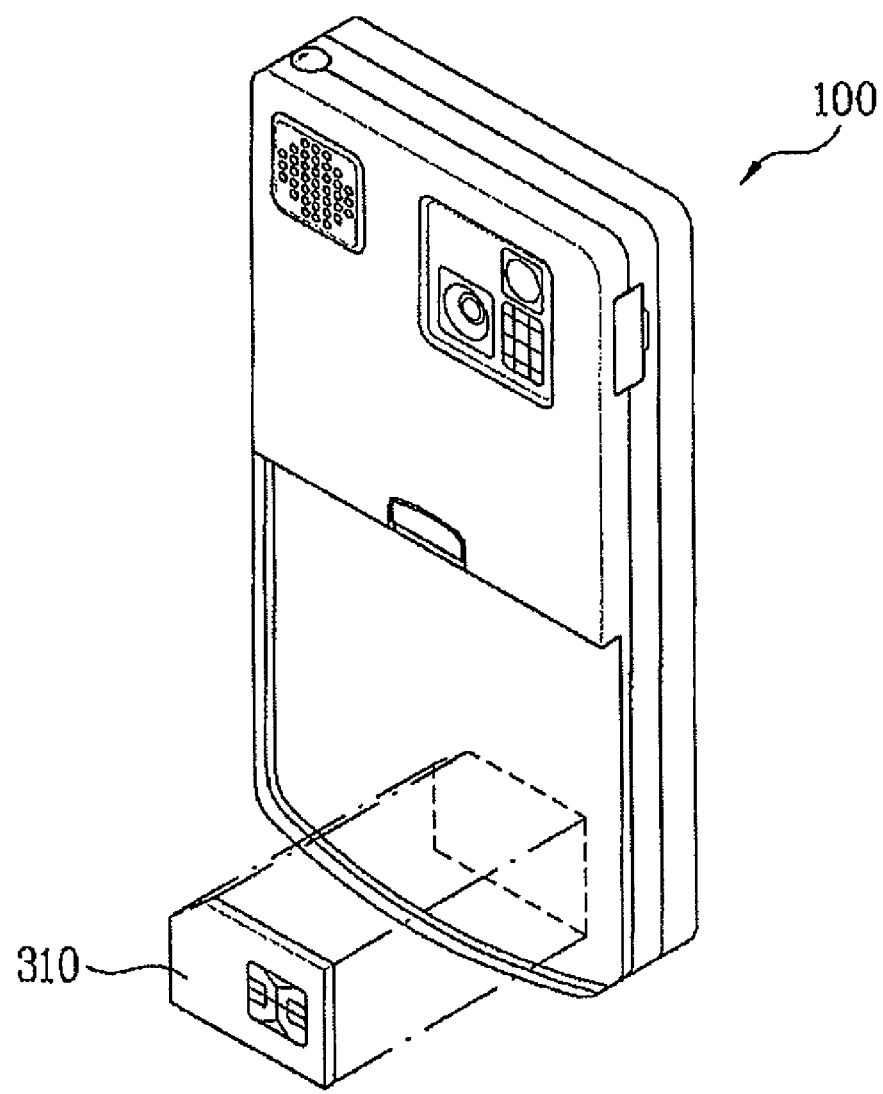

FIG. 3A and FIG. 3B are diagrams for depicting how an identity device is detachably loaded in a terminal according to one embodiment of the present invention. In this case, the identity device can include a SIM card.

Referring to FIG. 3A and FIG. 3B, the identity device 310 is detachably provided to the terminal 100. Therefore, an old identity device can be replaced by a new identity device in the terminal 100. The identity device 310 can be loaded in the terminal 100 by being assembled to the interface unit 170. Alternatively, the identity device 310 can be loaded in the terminal 100 by being connected with a connector separately provided for the assembly to the identity device 310.

Besides, a connecting means (not shown in the drawings) for connecting the identity device 310 and the terminal 100 together can be provided to any part of the terminal 100 such a backside, a lateral side, a front side and the like thereof.

In addition, the mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include, for example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of a non-limiting example only, further description will relate to a CDMA communication system, but such teachings apply equally to other system types.

Figure 4:
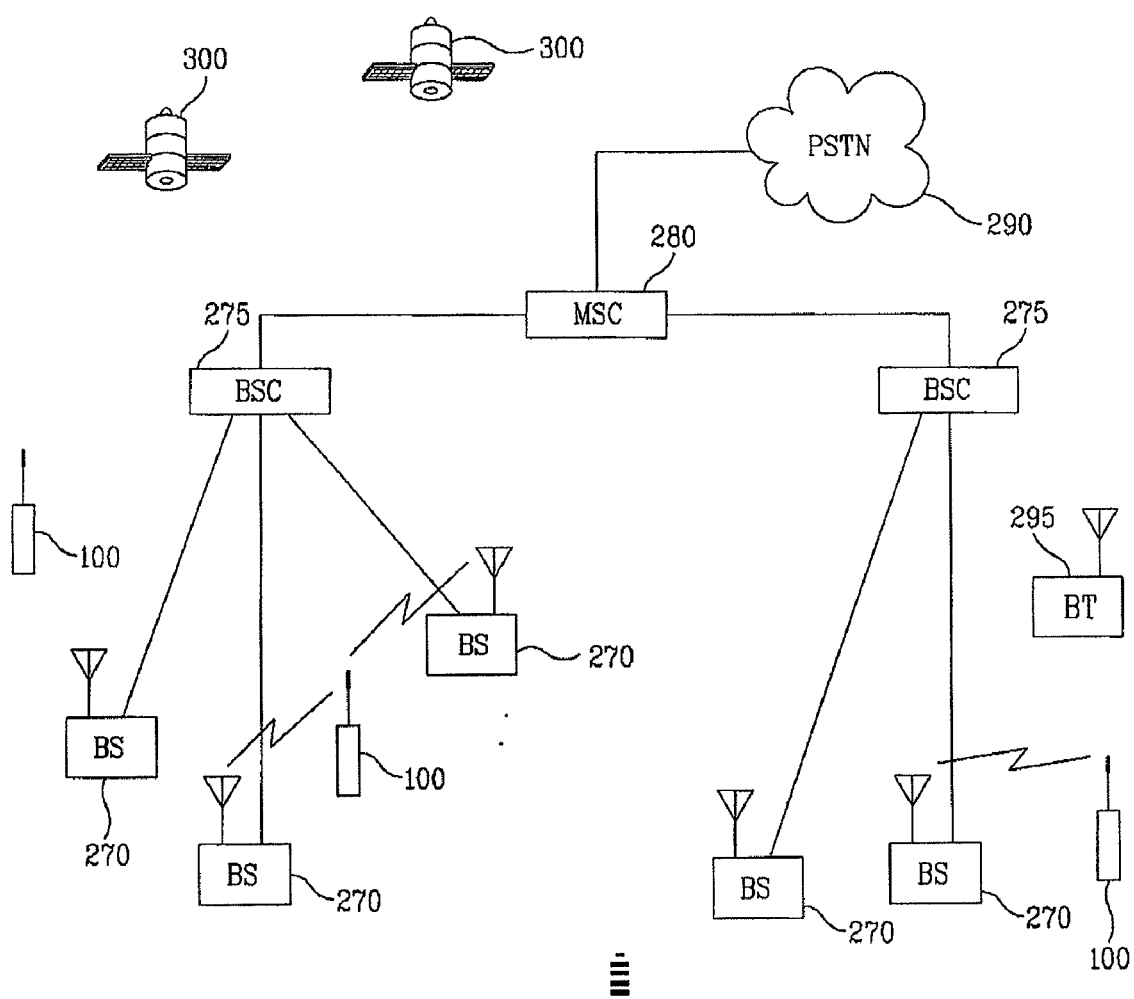
FIG. 4 is a block diagram of a CDMA wireless communication system operable with the terminal of FIGS. 1-3B.

Next, FIG. 4 illustrates a CDMA wireless communication system having a plurality of mobile terminals 100, a plurality of base stations 270, a plurality of base station controllers (BSCs) 275, and a mobile switching center (MSC) 280.

The MSC 280 is configured to interface with a public switch telephone network (PSTN) 290, and the MSC 280 is also configured to interface with the BSCs 275. Further, the BSCs 275 are coupled to the base stations 270 via backhaul lines. In addition, the backhaul lines may be configured in accordance with any of several interfaces including, for example, E1/T1, ATM, IP, PPP, Frame Relay, HDSL, ADSL, or XDSL. Further, the system may include more than two BSCs 275.

Also, each base station 270 may include one or more sectors, each sector having an omnidirectional antenna or an antenna pointed in a particular direction radially away from the base station 270. Alternatively, each sector may include two antennas for diversity reception. In addition, each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some instances, the term "base station" may be used to refer collectively to a BSC 275, and one or more base stations 270.

The base stations 270 may also be denoted as "cell sites." Alternatively, individual sectors of a given base station 270 may be referred to as cell sites. Further, a terrestrial digital multimedia broadcasting (DMB) transmitter 295 is shown broadcasting to mobile terminals 100 operating within the system.

In addition, the broadcast receiving module 111 (FIG. 1) of the mobile terminal 100 is typically configured to receive broadcast signals transmitted by the DMB transmitter 295. Similar arrangements may be implemented for other types of broadcast and multicast signaling as discussed above.

FIG. 4 further illustrates several global positioning system (GPS) satellites 300. Such satellites facilitate locating the position of some or all of the mobile terminals 100. In FIG. 4, two satellites are shown, but positioning information may be obtained with greater or fewer satellites.

In addition, the position-location module 115 (FIG. 1) of the mobile terminal 100 is typically configured to cooperate with the satellites 300 to obtain desired position information. However, other types of position detection technology, such as location technology that may be used in addition to or instead of GPS location technology, may alternatively be implemented. Some or all of the GPS satellites 300 may alternatively or additionally be configured to provide satellite DMB transmissions.

Further, during typical operation of the wireless communication system, the base stations 270 receive sets of reverse-link signals from various mobile terminals 100. The mobile terminals 100 engage in calls, messaging, and other communications.

In addition, each reverse-link signal received by a given base station 270 is processed within that base station 270, and the resulting data is forwarded to an associated BSC 275. The BSC 275 provides call resource allocation and mobility management functionality including soft handoffs between the base stations 270.

Further, the BSCs 275 also route the received data to the MSC 280, which provides additional routing services for interfacing with the PSTN 290. Similarly, the PSTN interfaces with the MSC 280, and the MSC 280 interfaces with the BSCs 275. The BSCs 275 also control the base stations 270 to transmit sets of forward-link signals to the mobile terminals 100.

In the following description, a control method applicable to the above-configured mobile terminal 100 is explained with respect to various embodiments. However, the following embodiments can be implemented independently or through combinations thereof. In addition, in the following description, it is assumed that the display 151 includes a touch screen.

Figure 5:
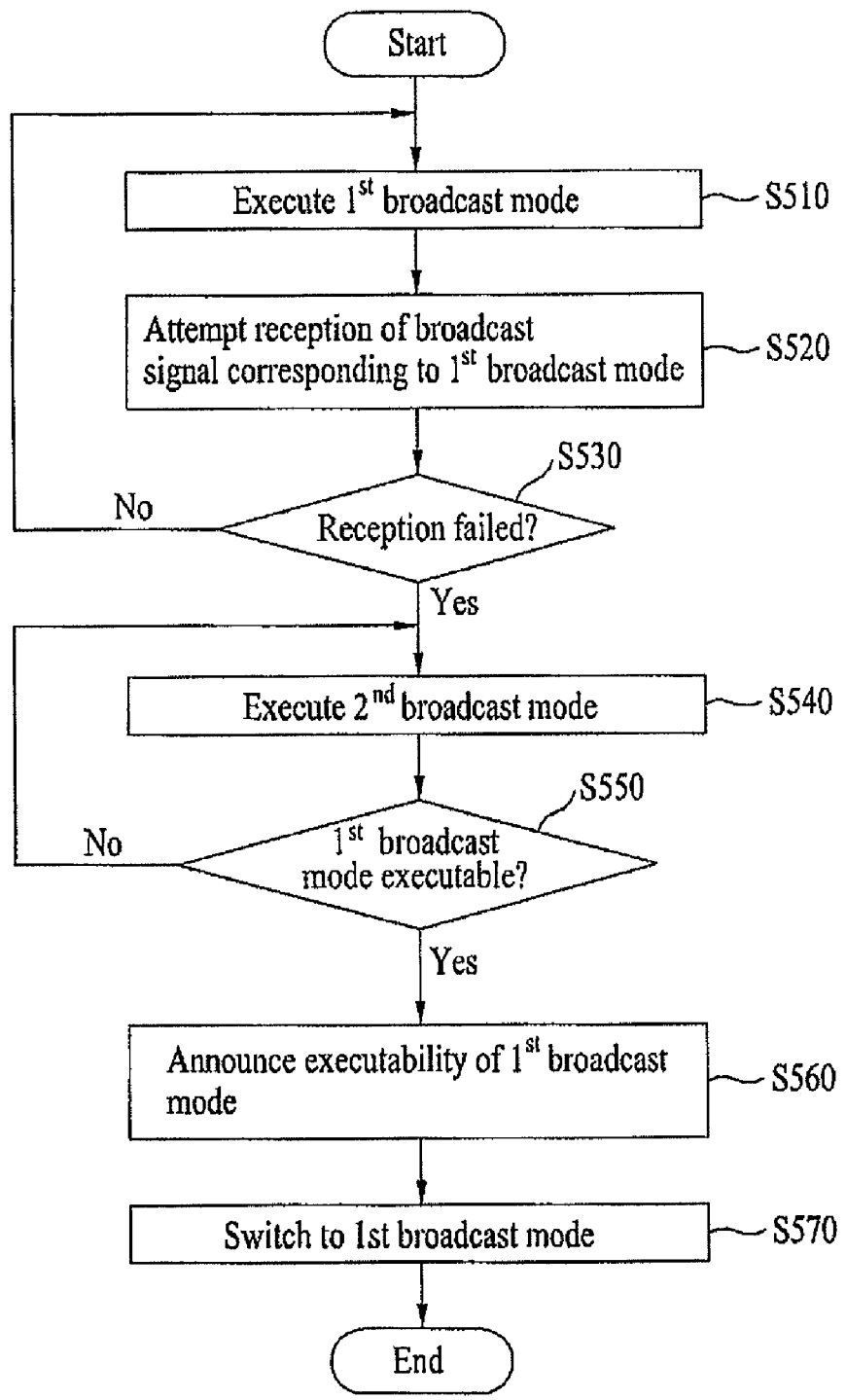
FIG. 5 is a flowchart illustrating a method of selecting a broadcast mode in a mobile terminal according to one embodiment of the present invention.

FIG. 5 is a flowchart illustrating a method of selecting a broadcast mode in a mobile terminal according to one embodiment of the present invention. FIG. 1 will also be referred to throughout the description of the present invention. As shown in FIG. 5, the mobile terminal 100 executes a first broadcast mode when the user requests the first broadcast mode or the terminal is entered into the broadcast mode (S510).

Further, the user can request the broadcast mode entry function, or if a broadcast is currently output, the execution of the first broadcast mode is already in progress.

In addition, the broadcast mode can be provided differently for each particular network for implementing a broadcasting system or per a broadcast service provider. For instance, the broadcast mode can include a mode for a broadcast signal reception via a broadcast network (hereinafter called the 'broadcast network mode') or a mode for a broadcast signal reception via the Internet (hereinafter called the 'Internet mode'). Further, when a broadcast network mode differs per broadcast service provider, the broadcast mode can include a broadcast network mode corresponding to a specific broadcast service provider.

Specifically, when the broadcast mode differs per the broadcast service provider, the mobile terminal 100 identifies a broadcast service provider and executes a broadcast network mode corresponding to the identified broadcast service provider.

For instance, when the mobile terminal 100 is set to execute a broadcast network mode corresponding to a specific broadcast service provider, the mobile terminal 100 identifies the specific broadcast service provider and then executes the broadcast network mode corresponding to the identified specific broadcast service provider. When the mobile terminal 100 is able to execute a broadcast network mode corresponding to each of a plurality of broadcast service providers, the mobile terminal 100 identifies each of a plurality of the broadcast service providers and is then executes the broadcast network mode corresponding to the broadcast service provider selected from the identified broadcast service providers.

In addition, the mobile terminal 100 receives data containing information for identifying a broadcast service provider (hereinafter referred to as the 'identification information') from an external broadcast server via the wireless communication unit 110. The mobile terminal 100 identifies each broadcast service provider using the identification information contained in the received data. In this instance, the data containing the identification information can be referred to as the channel/program relevant data.

For example, FIGS. 6A to 6E are structural diagrams of data containing identification information, including, for example, a platform ID, transport stream ID, an original network ID, etc. that are used as identification information defined an SI (service information)/PSI (program specific information) table format in DVB-H.

In more detail, and referring to FIG. 6A, the transport stream ID and original network ID can be included as identification information in a service description table that is an example for SI/PSI table. In FIG. 6B, the platform ID can be included as identification information in a network information table as an example for SI/PSI table.

Further, in FIG. 6C, the platform ID can be included as identification information in a program map table as an example for SI/PSI table. Also, in FIG. 6D, the platform ID can be included as identification information in an IP/MAC information table as an example for SI/PSI table. Similarly, in FIG. 6E, the transport stream ID and original network ID can be included as identification information in a network information table as an example for SI/PSI table.

In addition, if the mobile terminal 100 is preset to execute a broadcast network mode corresponding to a specific broadcast service provider, a broadcast service provider identifying process using the above-described identification information may be unnecessary.

Referring again to FIG. 5, as the mobile terminal 100 executes the first broadcast mode in step S510, the mobile terminal 100 attempts a reception of a broadcast signal corresponding to the first broadcast mode via the wireless communication unit 110 (S520). That is, the controller 180 controls the wireless communication unit 110 to receive the signal corresponding to the first broadcast mode.

Further, the broadcast signal can include broadcast guide information or broadcast data. For instance, the broadcast guide information can be provided by being contained in and EPG of DMB or ESG of DBV-H. Also, the broadcast data can include audio/video data constructing a broadcast program.

In addition, the mobile terminal 100 controls the broadcast receiving module 111 to receive a broadcast signal when the first broadcast mode is the broadcast network mode. Further, the mobile terminal 100 controls the mobile communication module 112 to receive a broadcast signal when the first broadcast mode is the Internet mode.

Figure 7A:
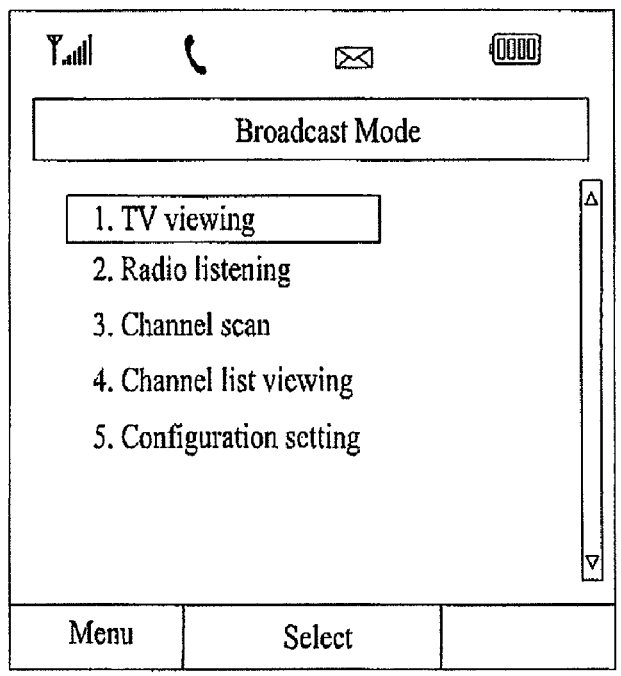
FIGS. 7A and 7B are overviews of display screens for a broadcast signal reception status according to a broadcast mode entry in a mobile terminal according to one embodiment of the present invention.
Figure 7B:
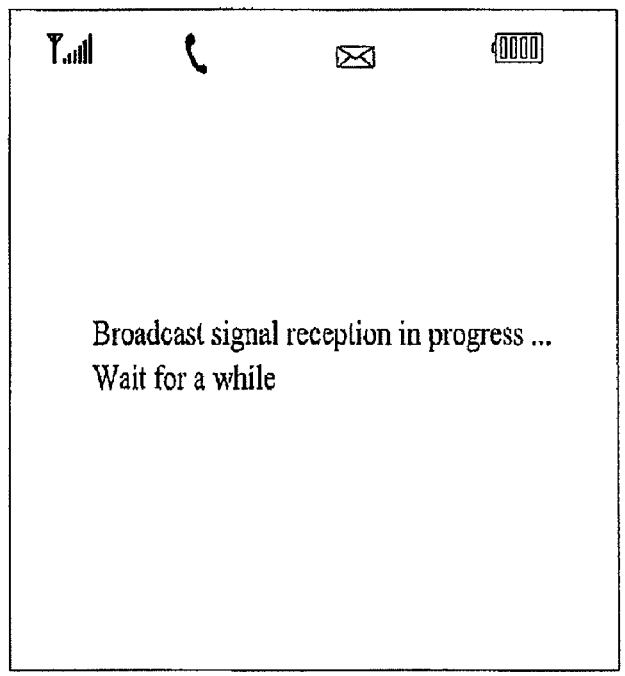

In addition, FIGS. 7A and 7B illustrate different display screens representing a broadcast signal reception status according to a first broadcast mode. Further, as shown in FIG. 7A, the mobile terminal 100 displays broadcast mode relevant menu items on the screen if a broadcast mode entry function is selected via a menu search or if a key provided for selection of a broadcast mode entry function is selected.

Then, in FIG. 7A, if the 'TV viewing' option is selected from the displayed broadcast mode relevant menu items, the mobile terminal 100 attempts a reception of a broadcast signal corresponding to the first broadcast mode (FIG. 7B).

Figure 8A:
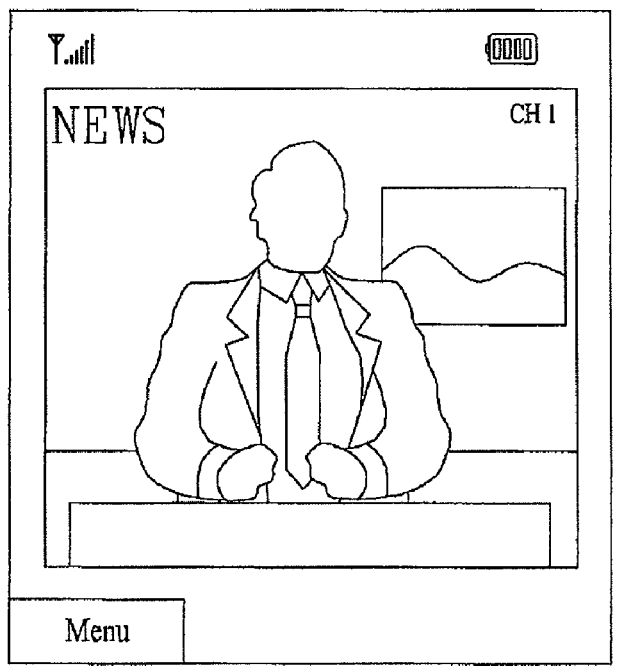
FIGS. 8A to 8C are overviews of display screens for a broadcast signal reception status when a broadcast signal reception sensitivity is reduced when outputting a broadcast in a mobile terminal according to one embodiment of the present invention.
Figure 8B:
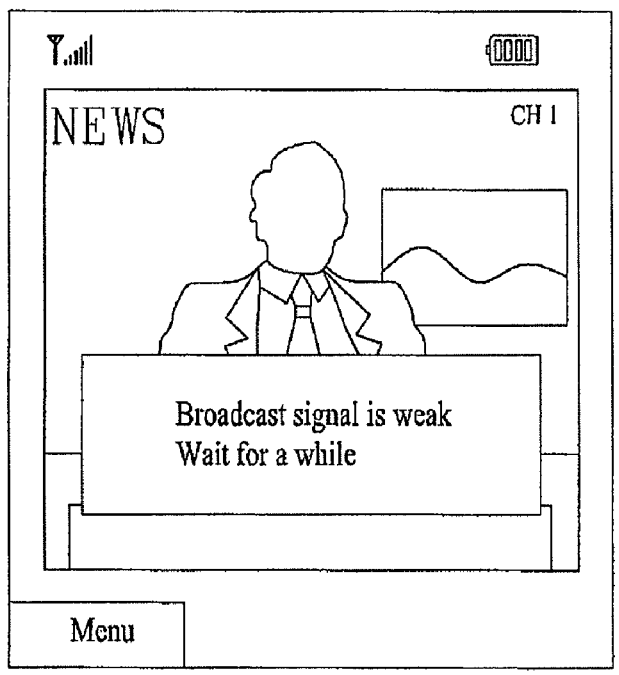
Figure 8C:
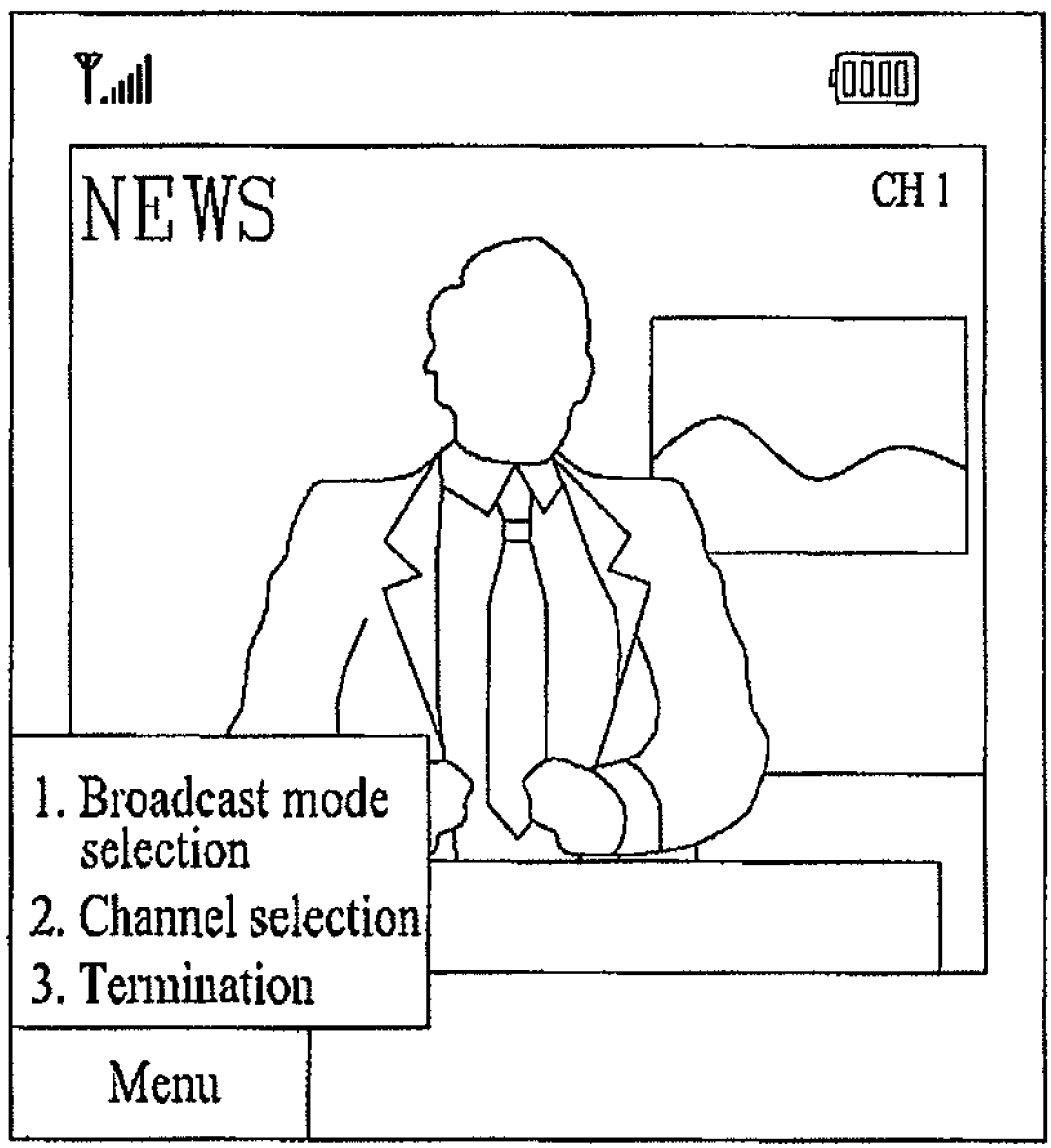

Next, FIGS. 8A to 8C are overviews of displays screens illustrating a broadcast signal reception status when a broadcast signal reception sensitivity is reduced or is weak when outputting a broadcast in a mobile terminal according to one embodiment of the present invention.

Also, in FIG. 8A, if a broadcast signal reception sensitivity is reduced equal to or smaller than a predetermined reference when outputting broadcast data according to the first broadcast mode execution, the mobile terminal 100 informs a user that the mobile terminal 100 is attempting a broadcast signal reception while attempting the reception of the broadcast signal (FIG. 8B).

In addition, in FIG. 8B, when the reduction of the broadcast signal reception sensitivity is maintained equal to or smaller than the predetermined reference, the mobile terminal 100 stops or pauses the outputting the broadcast data. Then if the user selects a menu area or option of the display screen, the controller 180 then displays menu options allow a user to select a broadcast mode selection, a channel selection, or to terminate the broadcast reception mode (FIG. 8C).

Further, if the mobile terminal 100 is in the course of outputting the broadcast data according to the first broadcast mode execution, the mobile terminal 100 may receive the broadcast signal from a currently used channel periodically or continuously.

Referring back to FIG. 5, the mobile terminal 100 decides whether the reception of the broadcast signal corresponding to the first broadcast mode fails or succeeds (S530).

For instance, after the mobile terminal 100 has attempted the broadcast signal reception for a predetermined period of time in step S520, the mobile terminal 100 is able to decide whether the reception of the broadcast signal fails at or after a timing point of expiration of the predetermined period of time (S530).

Further, to decide whether or not the reception of the broadcast signal fails in step S530, the mobile terminal 100 can use the aforesaid identification information. For instance, when one of the various identification informations defined in the channel/program relevant data (e.g., SI/PSI data) is modified, i.e., when the identification information different from identification information corresponding to the first broadcast mode is defined in the channel/program relevant data or identification information corresponding to the first broadcast mode is not defined in the channel/program relevant data, the mobile terminal 100 decides that the broadcast signal reception corresponding to the first broadcast mode has failed.

In this instance, the mobile terminal 100 is able to receive the channel/program relevant data periodically or randomly via the wireless communication unit 110. In addition, when the mobile terminal 100 decides that the broadcast signal reception has failed, the mobile terminal 100 selectively executes a second broadcast mode (S540).

Further, if the first broadcast mode is the broadcast network mode corresponding to a first broadcast service provider, the second broadcast mode can include at least one of an Internet mode and a broadcast network mode corresponding to a second broadcast service provider. For example, if the first broadcast mode is an Internet mode, the second broadcast mode can include a broadcast network mode.

Also, the mobile terminal 100 can perform the selective execution step S540 for a broadcast mode entry and/or for outputting a broadcast according to the broadcast mode entry. When deciding that the broadcast signal reception has failed, the mobile terminal 100 selectively executes the second broadcast mode to correspond to a selection action of a user via the user input unit 130.

In addition, as discussed above, the mobile terminal 100 informs the user that the second broadcast mode can be selected. Then, if the user selects an execution of the second broadcast mode, the mobile terminal 100 is able to execute the selective execution step S540.

Also, when the terminal 100 is preset to automatically execute the second broadcast mode when the broadcast signal reception fails, the mobile terminal 100 automatically executes the second broadcast mode. Further, the terminal 100 can be set to automatically execute the second broadcast mode via user menu options provided by the terminal.

Further, when the terminal 100 is preset to execute the second broadcast mode based on a specific condition when the broadcast signal reception fails, the mobile terminal 100 identifies the second broadcast mode meeting the specific condition and then executes the identified second broadcast mode. For instance, the specific condition can include a sufficient signal sensitivity broadcast mode, a sufficient preference broadcast mode, a similar channel providing broadcast mode and the like. Again, the user can set this present mode using the appropriate menu options provided on the terminal 100.

Further, if the terminal 100 decides that the broadcast signal reception has succeeded (No in S530), the mobile terminal 100 returns to the executing step S510 of the first broadcast mode.

Figure 9:
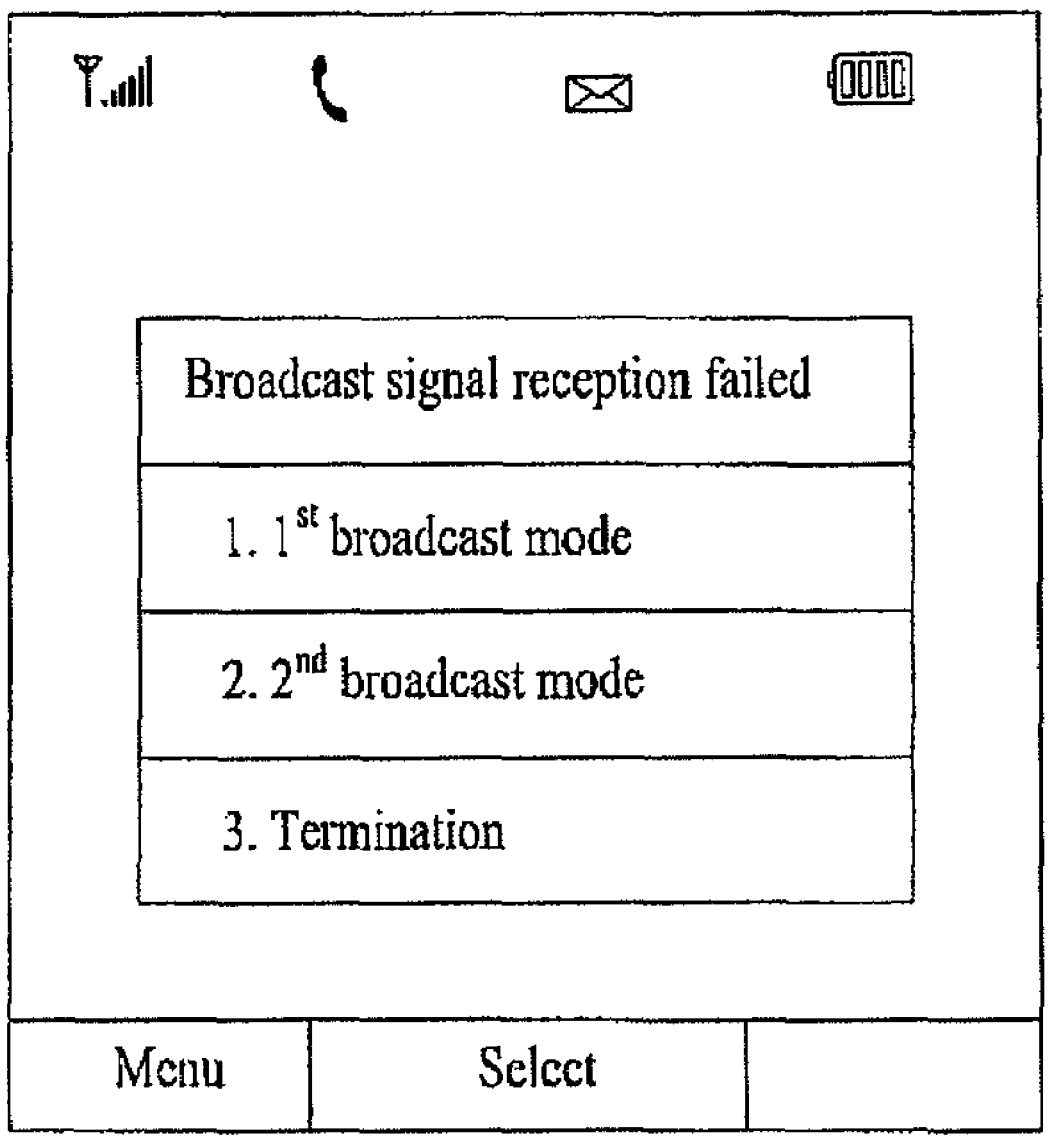
FIGS. 9 to 12B are overviews of display screens for displaying a window for enabling a second broadcast mode to be selected in a mobile terminal according to one embodiment of the present invention.

Next, FIGS. 9 to 12B are overviews of display screens for displaying a window allowing a user to select a second broadcast mode in a mobile terminal according to one embodiment of the present invention. In more detail, FIG. 9 is an overview of a displays screen applicable to a first broadcast mode that is a broadcast network mode or an Internet mode.

Referring to FIG. 9, when reception of the first broadcast mode fails, the mobile terminal 100 displays a window allowing a user to select one of 're-execution of the first broadcast mode', 'execution of a second broadcast mode' and 'termination of the first broadcast mode'.

If the user selects the menu item corresponding to the 'execution of the second broadcast mode' via the user input unit 130, the mobile terminal 100 executes the second broadcast mode. Meanwhile, if the user selects the menu item corresponding to the 're-execution of the first broadcast mode' or the 'termination of the first broadcast mode', the mobile terminal 100 re-executes the first broadcast mode or terminates the first broadcast mode. Thus, the mobile terminal 100 can selectively execute the second broadcast mode according to a selection signal from the user input unit 130.

Figure 10A:
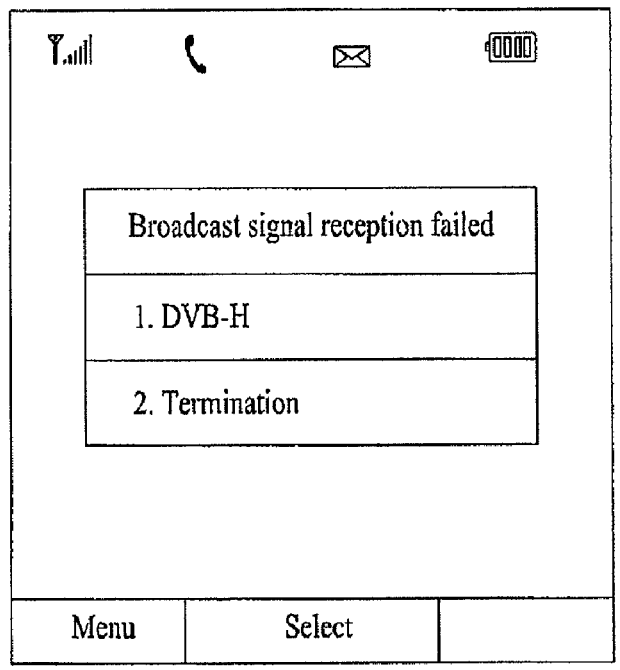
Figure 10B:
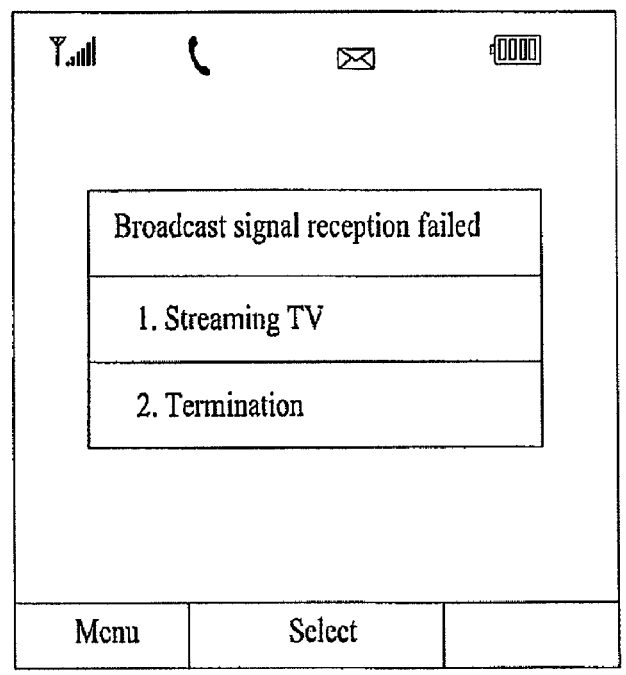

Next, FIGS. 10A and 10B are overviews of display screens when the first broadcast mode is the broadcast network mode. In particular, FIG. 10A shows a status that a broadcast signal is not receivable due to poor broadcast signal reception sensitivity despite a presence of the broadcast signal on a broadcast network. Further, FIG. 10B shows a status that a broadcast signal is not receivable due to an absence of the broadcast signal on a broadcast network.

In these examples, the first broadcast mode is 'DVB-H' mode as an example for a broadcast network mode and the second broadcast mode is a 'streaming TV' mode as an example for an Internet mode.

Referring to FIG. 10A, although a broadcast signal is not receivable, and because there exists a current broadcast signal, the mobile terminal 100 displays a window allowing a user to select one of 're-execution of the DVB-H mode' or 'termination of the broadcast mode'. Further, a selection item allowing a user to select 'streaming TV execution' can be added to increase a width of user's selection.

Referring to FIG. 10B, because a broadcast signal does not exist, the mobile terminal 100 displays a window allowing a user to select one of 'execution of the streaming TV mode' and 'termination of the broadcast mode'. Further, a selection item allowing a user to select 're-execution of the DVB-H mode' can be added to add for the situation in which there is a presence of broadcast signal.

In addition, if the user selects the menu item corresponding to the 're-execution of the DVB-H mode' or 'execution of the streaming TV mode' via the user input unit 130 in FIG. 10A or FIG. 10B, the mobile terminal 100 respectively re-executes the DVB-H mode or executes the streaming TV mode as a second broadcast mode. That is, the mobile terminal 100 selectively executes the streaming TV as the second broadcast mode according to the selection signal from the user input unit 130.

Figure 11A:
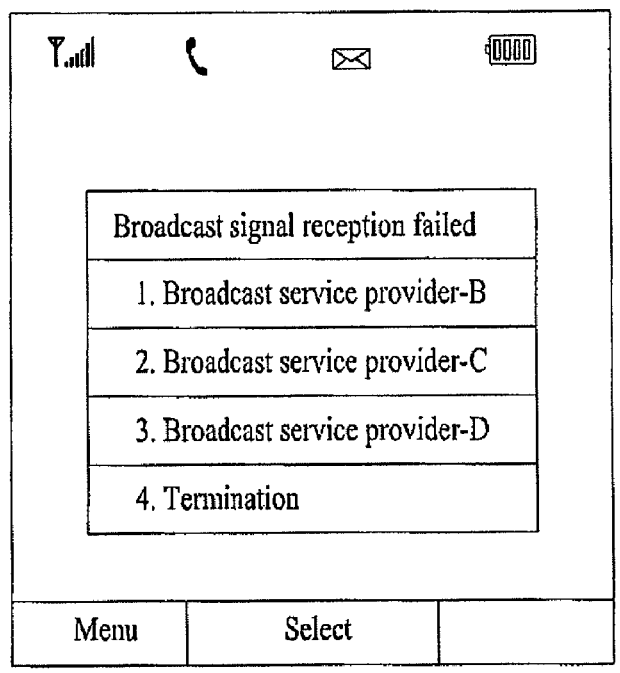
Figure 11B:
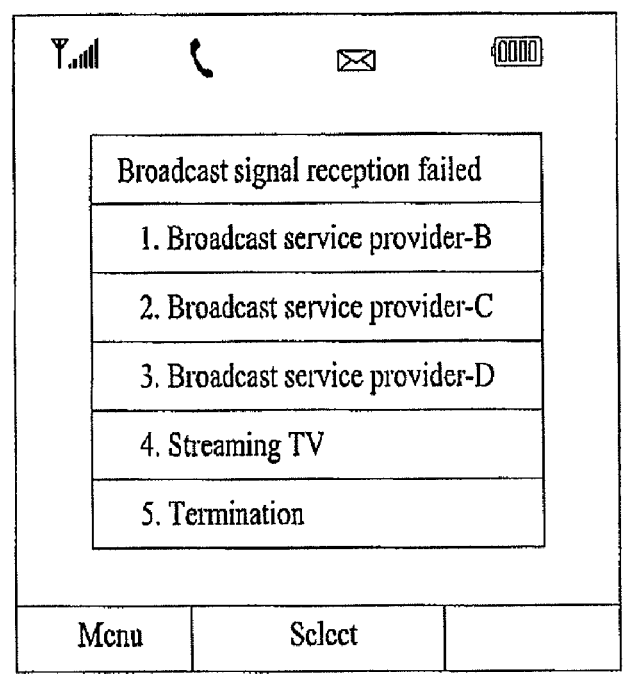

Next, FIGS. 11A and 11B are overviews of display screens when the first broadcast mode is a broadcast network mode corresponding to a first broadcast service provider. In addition, prior to displaying the image shown in FIG. 11A or 11B, and when the broadcast signal corresponding to the first broadcast mode fails, the mobile terminal 100 scans a frequency assigned to at least one different broadcast service provider.

Thus, the mobile terminal 100 checks a currently available different broadcast service provider as a result of the scan. In particular, the mobile terminal 100 receives data containing the aforesaid identification information per the broadcast service provider when performing the scanning operation and identifies an available broadcast service provider using the identification information. Moreover, the received data may contain identification information on the currently available broadcast service provider.

Referring to FIG. 11A, the mobile terminal 100 displays a list of at least one or more different available broadcast service providers as a scan result. In FIG. 11B, the mobile terminal 100 displays a list containing an item allowing a user to select the 'streaming TV execution mode' as an example for an Internet mode.

If a specific different broadcast service provider is selected from the displayed list by a user through the user input unit 130 in FIG. 11A or 11B, the mobile terminal 100 executes a broadcast network mode corresponding to the selected specific different broadcast service provider as the second broadcast mode. Also, if a menu item corresponding to the 'streaming TV execution mode' is selected in FIG. 11B, the mobile terminal 100 executes a streaming TV as the second broadcast mode.

Namely, the mobile terminal 100 selectively executes the broadcast network mode corresponding to the specific different broadcast service provider or the streaming TV mode as the second broadcast mode according to a selection signal from the user input unit 130.

Figure 12A:
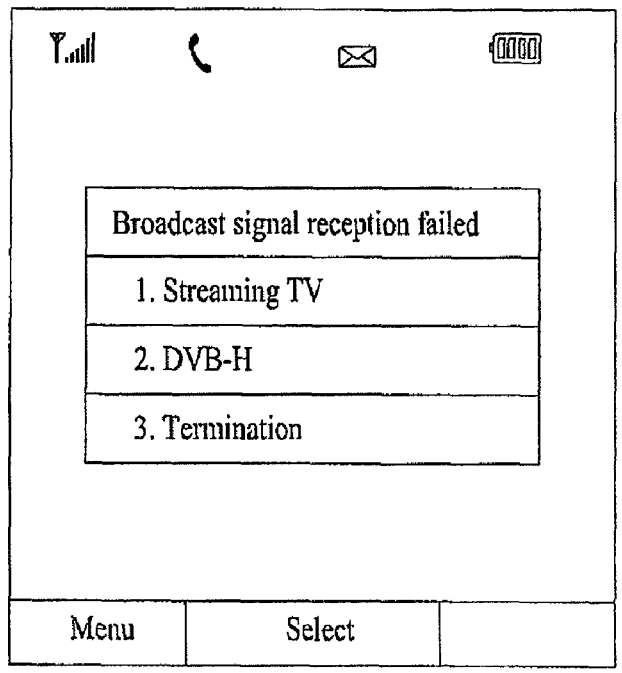
Figure 12B:
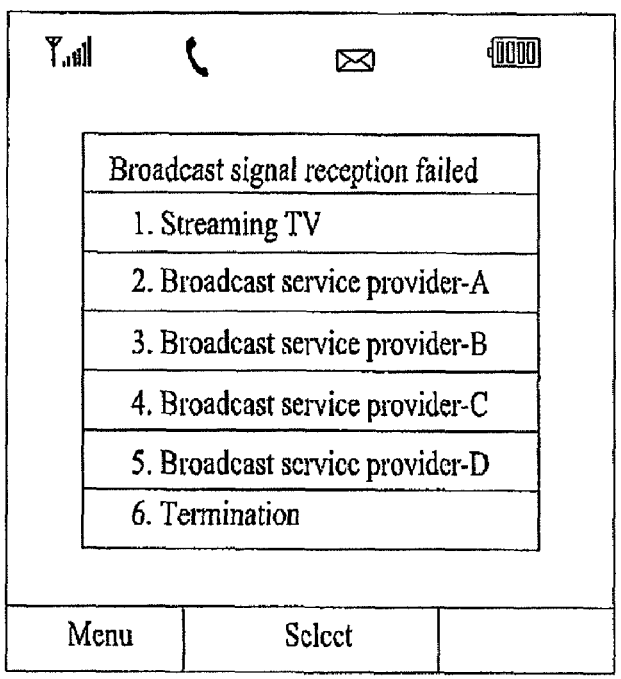

Next, FIGS. 12A and 12B are overviews of the situation in which the first broadcast mode is the Internet mode. In particular, FIG. 12A illustrates the situation in which the only the broadcast network mode set in the mobile terminal 100 is executable. Also, FIG. 12B illustrates the situation in which a plurality of broadcast network modes (e.g., a preset broadcast network mode and a different broadcast network mode included) are executable.

Referring to FIG. 12A, when the broadcast signal corresponding to the Internet mode fails, the mobile terminal 100 displays a window allowing the user to select one of the 're-execution of the Internet mode (e.g., streaming TV)', 'execution of the broadcast network mode (e.g., DVB-H)' and 'termination of the broadcast mode'.

In FIG. 12A, if the user selects the menu item corresponding to the 'execution of the broadcast network mode' via the user input unit 130, the mobile terminal 100 executes the broadcast network mode as the second broadcast mode. Referring to FIG. 12B, if the broadcast signal corresponding to the Internet mode fails, the mobile terminal 100 scans a frequency assigned to at least one broadcast service provider using the broadcast receiving module 111. The mobile terminal 100 is then displays a list of at least one available broadcast service provider according to a result of the scanning operation. In addition, the list can contain an item for allowing the user to select the 're-execution of the Internet mode (e.g., streaming TV)'.

In FIG. 12B, if the user selects a specific broadcast service provider from the displayed list via the user input unit 130, the mobile terminal 100 executes a broadcast network mode corresponding to the selected specific broadcast service provider as the second broadcast mode. In addition, if the user selects the menu item corresponding to 'Internet mode re-execution', the mobile terminal 100 re-executes the Internet mode.

Therefore, the mobile terminal 100 is able to execute the broadcast network mode corresponding to the specific broadcast service provider as the second broadcast mode according to a selection signal from the user input unit 130.

Referring again to FIG. 5, the mobile terminal 100 checks whether execution of the first broadcast mode is possible when performing the selective execution step S540 of the second broadcast mode (S550). In this instance, the checking step S550 can be performed by the controller 180.

Further, the mobile terminal 100 performs the checking step S550 using a presence or non-presence of a broadcast signal corresponding to the first broadcast mode and a reception sensitivity thereof. For instance, if the first broadcast mode is the broadcast network mode (or the Internet mode), the mobile terminal 100 checks the presence and reception sensitivity of the broadcast signal corresponding to the first broadcast mode by operating the broadcast receiving module 111 (or the wireless internet module 113) periodically or continuously.

In addition, the mobile terminal 100 checks whether execution of the first broadcast mode is possible when executing the second broadcast mode according to a user's selection or as a default.

Next, FIGS. 13A to 15B are overviews of display screens illustrating a presence or non-presence of availability for execution of the first broadcast mode when the second broadcast mode is executed in a mobile terminal according to one embodiment of the present invention.

Figure 13A:
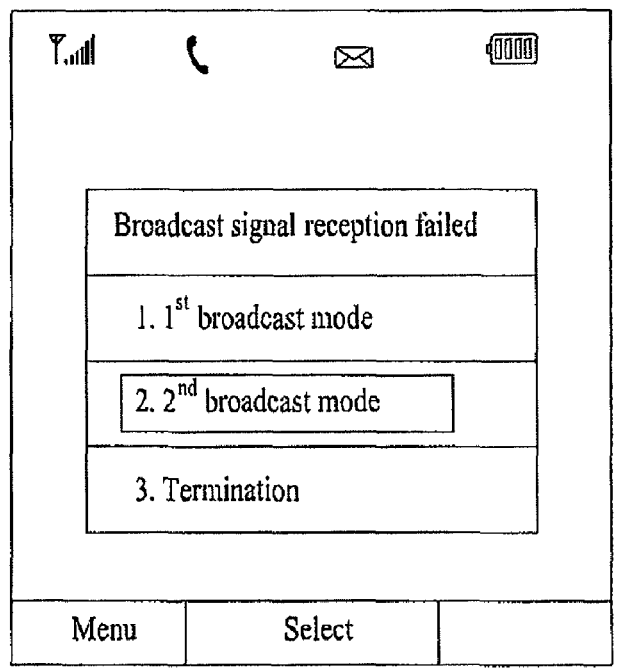
FIGS. 13A to 15B overviews of display screens depending on checking a presence or non-presence of availability for execution of a first broadcast mode when a second broadcast mode is executed in a mobile terminal according to one embodiment of the present invention.
Figure 13B:
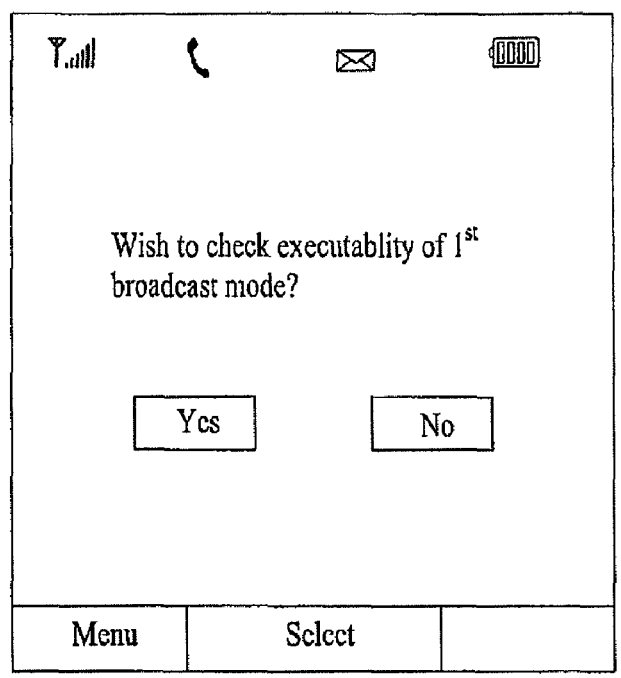

Referring to FIGS. 13A and 13B, if user selects the second broadcast mode, the mobile terminal 100 displays a window allowing the user to select whether to check the possibility of executing the first broadcast mode. If the user selects this option ("Yes") from the window, the mobile terminal 100 checks whether or not it is possible to execute the first broadcast mode while executing the second broadcast mode.

Figure 14A:
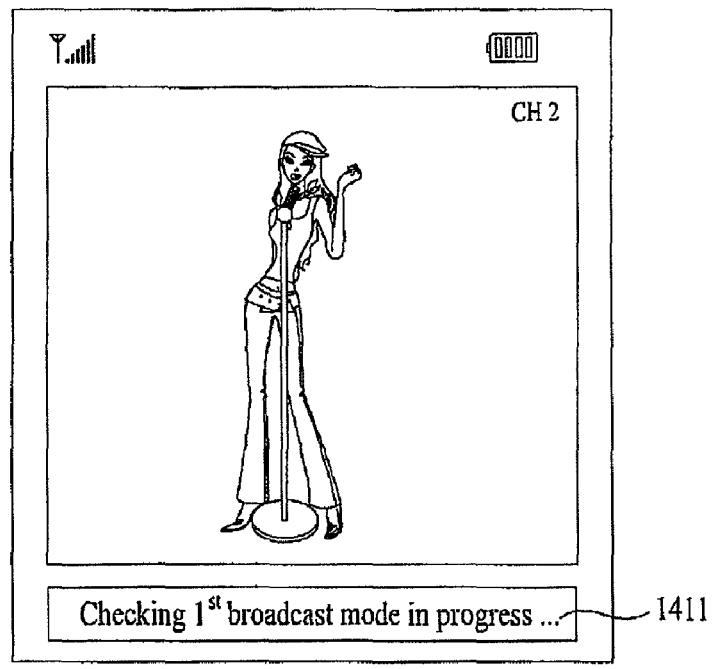
Figure 14B:
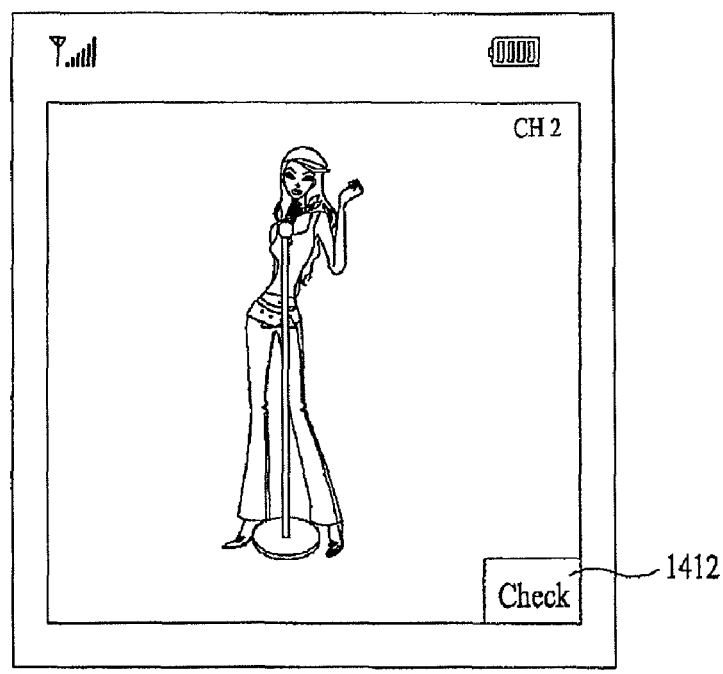

Next, referring to FIGS. 14A and 14B, the mobile terminal 100 informs the user that the execution possibility of the first broadcast mode is being checked when outputting a broadcast according to an execution of the second broadcast mode. For instance, the mobile terminal 100 informs the user using a text shown in FIG. 14A or an icon shown in FIG. 14B. Alternatively, the mobile terminal 100 can output or announce such information using an image, animation, voice, bell sound, vibration, lamp, etc.

Referring again to FIG. 5, if the mobile terminal 100 determines the execution of the first broadcast mode is possible (Yes in S550), the mobile terminal 100 announces the execution possibility of the first broadcast mode (S560) and switches a current mode to the first broadcast mode (S570).

Further, FIG. 5 illustrates the announcing step S560 and the switching step S570 being sequentially performed. However, at least one of the announcing step S560 and the switching step S570 can instead be performed. Alternatively, the order of the announcing step S560 and the switching step S570 may be changed.

Figure 15A:
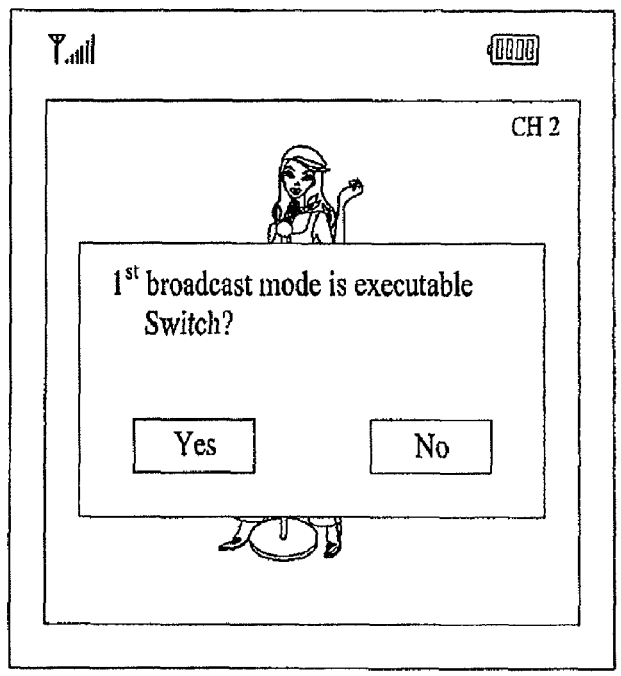
Figure 15B:
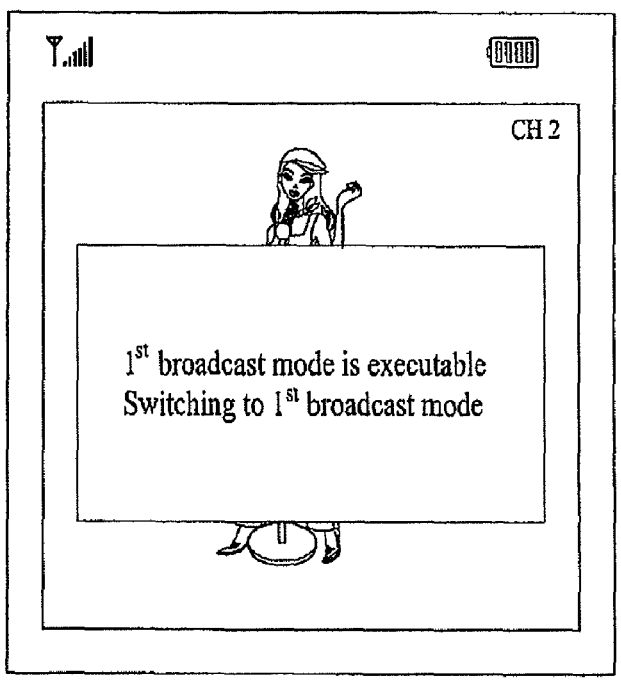

The announcing step S560 and the switching step S570 will now be explained in more detail with reference to FIGS. 15A and 15B. As shown in FIGS. 15A and 15B, the mobile terminal 100 outputs textual information for announcing that the first broadcast mode is executable via the display unit 151. A vibration, voice, bell sound lamp, icon and/or the like can also be used to announce that the first broadcast mode is executable.

Referring to FIG. 15A, the mobile terminal 100 displays a window allowing the user to select whether to switch to the first broadcast mode. If the user selects to switch to the first broadcast mode ('Yes'), the mobile terminal 100 switches the current mode to the first broadcast mode.

Referring to FIG. 15B, because it is possible to switch to the first broadcast mode, the mobile terminal 100 informs the user while performing the switching to the first broadcast mode. In this instance, whether to automatically switch to the first broadcast mode can be set by the user in advance.

Thus, according to one embodiment of the present invention, the above-described broadcast mode selecting method can be implemented in a program recorded medium as computer-readable codes. The computer-readable media can include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). Further, the computer can include the controller 180 of the mobile terminal 100.

Accordingly, the present invention provides several advantages.

First, if a first broadcast mode is substantially non-executable, embodiments of the present invention selectively execute a second broadcast mode, thereby reducing battery consumption caused by re-execution of a non-executable broadcast mode.

Secondly, if a broadcast network mode is impossible, embodiments of the present invention selectively execute the Internet mode, thereby enabling a broadcast signal to be received via the Internet for a poor status of a broadcast network.

Thirdly, embodiments of the present invention selectively execute the broadcast network mode or the Internet mode according to a presence or non-presence of a broadcast signal on a current broadcast network, thereby enhancing user's efficient broadcast viewing.

In addition, the above various embodiments may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a wireless communication unit configured to receive a broadcast signal;
   a controller configured to control the wireless communication unit to receive the broadcast signal corresponding to a first broadcast mode when the first broadcast mode is executed, and to selectively execute a second broadcast mode that is different than the first broadcast mode when a reception of the broadcast signal corresponding to the first broadcast mode fails; and
   a display unit configured to display a first window for selecting either re-execution of the first broadcast mode or execution of the second broadcast mode when the reception of the broadcast signal corresponding to the first broadcast mode fails, to display a second window allowing a user to request the controller check whether or not it is possible to re-execute the first broadcast mode while executing the second broadcast mode, and to display a broadcast signal corresponding to the second broadcast mode and information indicating the checking of re-executing the first broadcast mode.

2. The mobile terminal of claim 1, wherein the first and second broadcast modes comprise at least one of a mode for a broadcast signal reception via a broadcast network and a mode for a broadcast signal reception via the Internet.

3. The mobile terminal of claim 2, wherein when the first broadcast mode is the mode for the broadcast signal reception via the broadcast network from a first broadcast service provider, the second broadcast mode comprises at least one of the mode for the broadcast signal reception via the Internet and the mode for the broadcast signal reception via the broadcast network from a second broadcast service provider, and
   wherein when the first broadcast mode is the mode for the broadcast signal reception via the Internet, the second broadcast mode comprises the mode for the broadcast signal reception via the broadcast network.

4. The mobile terminal of claim 1, wherein the controller is further configured to decide the reception of the broadcast signal corresponding to the first broadcast mode has failed using at least one of a platform ID, a transport stream ID and an original network ID as identification information for identifying a broadcast service provider providing the broadcast signal corresponding to the first broadcast mode.

5. The mobile terminal of claim 4, wherein the identification information is defined in channel/program relevant data.

6. The mobile terminal of claim 1, further comprising:
   a user input unit configured to select either the re-execution of the first broadcast mode or execution of the second broadcast mode when the reception of the broadcast signal corresponding to the first broadcast mode fails,
   wherein the controller is further configured to selectively execute the second broadcast mode according to a selection signal from the user input unit.

7. The mobile terminal of claim 1, wherein when the first broadcast can be executed, the controller is further configured to switch back to the first broadcast mode based on an instruction to switch back to the first broadcast mode.

8. The mobile terminal of claim 1, wherein the broadcast signal corresponding to the second mode corresponds to a broadcast signal reception via the Internet.

9. The mobile terminal of claim 1, further comprising:
   wherein when the first broadcast mode is a mode for a broadcast signal reception via a broadcast network and the reception of the broadcast signal corresponding to the first broadcast mode fails, the controller is further configured to, via the wireless communication unit, scan a frequency assigned to each of one or more different broadcast service providers, to display a list of one or more available different broadcast service providers according to a result of the scan on the display unit, and to allow a specific different broadcast service provider to be selected from the displayed list via the user input unit, and wherein the controller is further configured to execute the second broadcast mode corresponding to the selected specific different broadcast service provider according to a selection signal from the user input unit.

10. The mobile terminal of claim 1, further comprising:
a user input unit,
wherein when the first broadcast mode is a mode for a broadcast signal reception via the Internet and the reception of the broadcast signal corresponding to the first broadcast mode fails, the controller is further configured to, via the wireless communication unit, scan a frequency assigned to each of one or more different broadcast service providers, to display a list of one or more available different broadcast service providers according to a result of the scan on the display unit, and to allow a specific different broadcast service provider to be selected from the displayed list via the user input unit, and wherein the controller is further configured to execute the second broadcast mode corresponding to the selected specific different broadcast service provider according to a selection signal from the user input unit.

11. The mobile terminal of claim 1, wherein the controller is further configured to selectively execute the second broadcast mode in at least one case of a broadcast mode entry and a broadcast output according to the broadcast mode entry.

12. A method of controlling a mobile terminal, the method comprising:
receiving, via a wireless communication unit of the mobile terminal, a broadcast signal corresponding to a first broadcast mode when the first broadcast mode is executed;
selectively executing, via a controller of the mobile terminal, a second broadcast mode that is different than the first broadcast mode when a reception of the broadcast signal corresponding to the first broadcast mode fails;
displaying, via a display unit of the mobile terminal, a first window for selecting either re-execution of the first broadcast mode or execution of the second broadcast mode when the reception of the broadcast signal corresponding to the first broadcast mode fails;
displaying, via the display unit, a second window allowing a user to request the controller check whether or not it is possible to re-execute the first broadcast mode while executing the second broadcast mode; and
displaying, via the display unit, a broadcast signal corresponding to the second broadcast mode and information indicating the checking of re-executing the first broadcast mode.

13. The method of claim 12, wherein the first and second broadcast modes comprise at least one of a mode for a broadcast signal reception via a broadcast network and a mode for a broadcast signal reception via the Internet.

14. The method of claim 13, wherein when the first broadcast mode is the mode for the broadcast signal reception via the broadcast network from a first broadcast service provider, the second broadcast mode comprises at least one of the mode for the broadcast signal reception via the Internet and the mode for the broadcast signal reception via the broadcast network from a second broadcast service provider, and
wherein when the first broadcast mode is the mode for the broadcast signal reception via the Internet, the second broadcast mode comprises the mode for the broadcast signal reception via the broadcast network.

15. The method of claim 12, further comprising:
deciding the reception of the broadcast signal corresponding to the first broadcast mode has failed using at least one of a platform ID, a transport stream ID and an original network ID as identification information for identifying a broadcast service provider providing the broadcast signal corresponding to the first broadcast mode.

16. The method of claim 15, wherein the identification information is defined in channel/program relevant data.

17. The method of claim 12, further comprising:
selecting either the re-execution of the first broadcast mode or execution of the second broadcast mode when the reception of the broadcast signal corresponding to the first broadcast mode fails,
wherein the selectively executing step includes selectively executing the second broadcast mode according to the selecting step.

18. The method of claim 12, wherein when the first broadcast can be executed, the method further comprises switching back to the first broadcast mode based on an instruction to switch back to the first broadcast mode.

19. The method of claim 12, wherein the broadcast signal corresponding to the second mode corresponds to a mode for a broadcast signal reception via the Internet.

20. The method of claim 12, wherein when the first broadcast mode is a mode for a broadcast signal reception via a broadcast network and the reception of the broadcast signal corresponding to the first broadcast mode fails, the method further comprises scanning a frequency assigned to each of one or more different broadcast service providers, displaying a list of one or more available different broadcast service providers according to a result of the scan on the display unit, and allowing a specific different broadcast service provider to be selected from the displayed list via the user input unit, and
wherein the selectively executing step executes the second broadcast mode corresponding to the selected specific different broadcast service provider according to a selection signal from a user input unit.

21. The method of claim 12, wherein when the first broadcast mode is a mode for a broadcast signal reception via the Internet and the reception of the broadcast signal corresponding to the first broadcast mode fails, the method further comprises scanning a frequency assigned to each of one or more different broadcast service providers, displaying a list of one or more available different broadcast service providers according to a result of the scan on the display unit, and allowing a specific different broadcast service provider to be selected from the displayed list via the user input unit, and
wherein the selectively executing step executes the second broadcast mode corresponding to the selected specific different broadcast service provider according to a selection signal from a user input unit.

22. The method of claim 12, wherein the selectively executing step selectively executes the second broadcast mode in at least one case of a broadcast mode entry and a broadcast output according to the broadcast mode entry.

23. The mobile terminal of claim 1, wherein the second broadcast mode is selected based on a preference broadcast mode.

24. The method of claim 12, wherein the second broadcast mode is selected based on a preference broadcast mode.

* * * * *